United States Patent
Zakharov et al.

(10) Patent No.: US 7,822,193 B2
(45) Date of Patent: Oct. 26, 2010

(54) ESTIMATION METHOD AND APPARATUS

(75) Inventors: Yuriy Zakharov, York (GB); Timothy Conrad Tozer, York (GB)

(73) Assignee: The University of York (GB)

( * ) Notice: Subject to any disclaimer, the term of this patent is extended or adjusted under 35 U.S.C. 154(b) by 1376 days.

(21) Appl. No.: 11/083,469

(22) Filed: Mar. 18, 2005

(65) Prior Publication Data

US 2006/0210056 A1 Sep. 21, 2006

(51) Int. Cl.
*H04M 9/08* (2006.01)

(52) U.S. Cl. ................................. 379/406.08
(58) Field of Classification Search ............. 379/406.08
See application file for complete search history.

(56) References Cited

U.S. PATENT DOCUMENTS

2003/0210797 A1* 11/2003 Kreifeldt et al. ............. 381/93

FOREIGN PATENT DOCUMENTS

SU 1352394 A1 11/1987

OTHER PUBLICATIONS

"Local Splines in Signal Processing Applications: Low Complexity, High Accuracy," Y.V. Zakharov and T.C. Tozer, Communication Research Group, Department of Electronics, University of York, York YO10 5DD, UK, pp. 1-5.
"Spectral Domain B-Spline Identification in Acoustic Echo Cancellation," Y.Zakharov and T. Tozer, Department of Electronics, University of York, York YO10 5DD, UK, 4 pages.
IEICE Trans. Fundamentals, "Adaptive Cross-Spectral Technique for Acoustic Echo Cancellation," vol. E82-A, No. 4, Apr. 1999, pp. 634-639.
IEEE Transactions on Speech and Audio Processing, "Recursive Identification of Acoustic Echo Systems Using Orthonormal Basis Functions," Lester S. H. Ngia, vol. 11, No. 3, May 2003, pp. 278-293.

* cited by examiner

*Primary Examiner*—Alexander Jamal
(74) *Attorney, Agent, or Firm*—Pillsbury Winthrop Shaw Pittman LLP

(57) ABSTRACT

A method and apparatus for producing an estimate of the acoustic response an environment. The method comprises receiving a first signal, and a second signal including a part of the first signal. The first and second signals are combined to produce a third signal. The first signal is combined with itself to produce a fourth signal. A plurality of weighted means of said third signal are computed and summed to produce a plurality of first summations. A plurality of weighted means of said fourth signal are computed and summed to produce a plurality of second summations. Said estimate is generated from said first and second summations.

49 Claims, 11 Drawing Sheets

```
function h=DCD_splines(R,N,M,H,Nit,b,NB);
h=zeros(N,1); d=[H -H];
for m=1:M
    d=d/2;
    for it=1:Nit
        Flag=0;
        for p=1:N
            [v arg]=max([b(p),-b(p),R(p,p)*d(1)/2]);
            if arg<3
                Flag=1;
                h(p)=h(p)+d(arg);
                i1=max(1,p-3); i2=min(NB,p+3);
                b(i1:i2)=b(i1:i2)-d(arg)*R(p,i1:i2);
            end
        end
        if Flag==0 break; end
    end
    if it==Nit break; end
end
```

FIG 4

```
function [B,Kmin,Kmax,Nb]=B_spline_basis(Fs,FL,FH,DL,DH,Nfft);
% Calculation of the frequency set:
  F=[FL-3*DL FL-2*DL FL-DL FL]; % first four frequencies;
  dd=(DH-DL)/(FH-FL-DH);
  n=5;
  D=DL;
  FF=FL;
  while FF<FH
     FF=FF+D;
     F=[F FF];
     D=DL+dd*(FF-FL);
     n=n+1;
  end
  n=n-1;
  ff=F(n)/FH;
  F=F/ff;
  F=[F F(n)+DH F(n)+2*DH F(n)+3*DH]; % last three frequencies;
  [s0 size_F]=size(F);
  Nb=size_F-4;          % number of B-splines;
  deltaF=Fs/Nfft; q=1;
  Kmin=zeros(1,Nb);
  Kmax=zeros(1,Nb);
  % Calculation of B-splines B and boundary fqs Kmin, Kmax:
  for n=1:Nb
    min_N=fix(F(n)/deltaF)+1;
    if F(n)<FL
       min_N=fix(FL/deltaF)+1;
    end
    max_N=fix(F(n+4)/deltaF)+1;
    if F(n+4)>FH
       max_N=fix(FH/deltaF)+1;
    end
    Kmin(n)=min_N; Kmax(n)=max_N;
    for k=min_N:max_N
        f=(k-1)*deltaF;
        B(q,k)=B_spl3(F(n:n+4),f)
    end
    q=q+1;
    if q==5
       q=1;
    end
end
```

FIG 9

```
function [b] = B_spl3(F,f)
%   Calculation of cubic B-splines.
%   F - set of five frequencies, defining the B-spline;
%   f - argument;
%   b - B-spline at the frequency f.
alpha=zeros(1,4); beta=zeros(1,3); gamma=zeros(1,2);
for r=1:4
        if f>=F(r)
            if f<F(r+1)
                alpha(r)=1/(F(r+1)-F(r));
            end
        end
end
for r=1:3
      beta(r)=((f-F(r))*alpha(r)+(F(r+2)-f)*alpha(r+1))/(F(r+2)-F(r));
end
for r=1:2
      gamma(r)=((f-F(r))*beta(r)+(F(r+3)-f)*beta(r+1))/(F(r+3)-F(r));
end
b=(f-F(1))*gamma(1)+(F(5)-f)*gamma(2);
```

FIG 10

ESTIMATION METHOD AND APPARATUS

BACKGROUND OF THE INVENTION

1. Field of the Invention

The present invention relates to a method for estimating the response of a system. More particularly, the present invention relates to a processing method which may be used to estimate the acoustic response of an environment.

2. Description of the Related Art

There is a requirement for methods and apparatus for removing echo signals from a signal output by a microphone. Such methods and apparatus have applications in, for example, hands free telephones. Here the echo signal is created by a signal received from another party which is output through a loudspeaker and input to the microphone.

One known echo cancellation apparatus takes a cross-correlation of the signal output by the loudspeaker with the signal output by the microphone, and an autocorrelation of the signal output through the loudspeaker. By using known techniques to solve a system of linear equations created using this cross-correlation and autocorrelation data, a set of filter coefficients can be generated. These coefficients can then be used to filter the signal input to the loudspeaker, and to produce an estimate of the echo signal included in the signal output by the microphone. This estimate is then subtracted from the signal output by the microphone to obtain the signal of interest.

The known echo cancellation apparatus described above is effective in reasonably accurately cancelling echo signals from the signal output from the microphone.

However, the known apparatus is unable to cope with a so-called "double talk" situation where both parties speak simultaneously causing errors in estimating the filter coefficients, such that an estimate of the echo signal is no longer accurately generated. Additionally, the autocorrelation may cause the equations to be ill conditioned, making it difficult to accurately solve the system of equations, and also making solution of the equations a process with high computational complexity.

In order to overcome this problem, some known echo cancellers are capable of detecting double-talk, and simply freezing the filter coefficients. However, it is often the case that filter coefficients are frozen incorrectly, meaning that the echo is not correctly cancelled, and in some cases, even increased.

BRIEF SUMMARY OF THE INVENTION

It is an object of the present invention to obviate or mitigate one or more of the problems outlined above.

The present invention provides a method for producing an estimate of the acoustic response of an environment. The method comprises receiving a first signal, and a second signal. The second signal including an acoustic echo of the first signal. Said first signal and said second signal are combined to produce a third signal, and said first signal is combined with itself to produce a fourth signal: A plurality of weighted means of said third signal are computed and summed so as to provide a plurality of first summations. A plurality of weighted means of said fourth signal are computed and summed to produce a plurality of second summations. The estimate of the acoustic response is generated from said first and second summations.

The method may be used, for example, in a handsfree telephone where a first speech signal is received and output through a loudspeaker. A second speech signal is input to a microphone together with part of the first speech signal output through the loudspeaker. In this case, the response of the system is defined by the manner in which an echo of the first signal is generated and included in the signal input to the microphone. Here, the response is an acoustic response determined by, for example, the geometry of the environment in which the microphone and loudspeaker are situated.

The invention can include generating a system of linear equations from said first and second summations. Such linear equations can be efficiently solved, as it is known that the system of equations is not ill conditioned, given that the coefficient matrix has dominant diagonals. The system of equations can be solved using the dichotomous coordinate descent algorithm, or any other suitable algorithm for solving systems of linear equations.

The first signal may be generated by spectrally transforming a first time domain signal. Similarly, the second signal may be generated by spectrally transforming a second time domain signal. Suitable spectral transforms include the Fourier transform and the Hadamard transform. When the Fourier transform is used, the time domain signals are transformed into frequency domain signals. Some embodiments of the invention use the fast Fourier transform as an efficient way of computing the Fourier transform of a discrete time domain signal.

The third signal may be the cross spectrum of the first and second signals, and the fourth signal may be the auto spectrum of the first signal. The weighted means may be computed by multiplying at least some values of the third and/or fourth signal by values generated using one or more predetermined polynomial functions. The predetermined polynomial functions are preferably B-splines. B-splines of various order can be used, although it has been found that cubic B-splines provide particularly desirable results.

Embodiments of the present invention will now be described, by way of example, with reference to the accompanying drawings, in which:

BRIEF DESCRIPTION OF THE SEVERAL VIEWS OF THE DRAWINGS

FIG. 4 is a MATLAB program implementing the process of the flow chart of FIG. 3;

FIGS. 9 and 10 are MATLAB code fragments for creation of cubic B-spline functions;

DETAILED DESCRIPTION OF THE INVENTION

Figure 1:
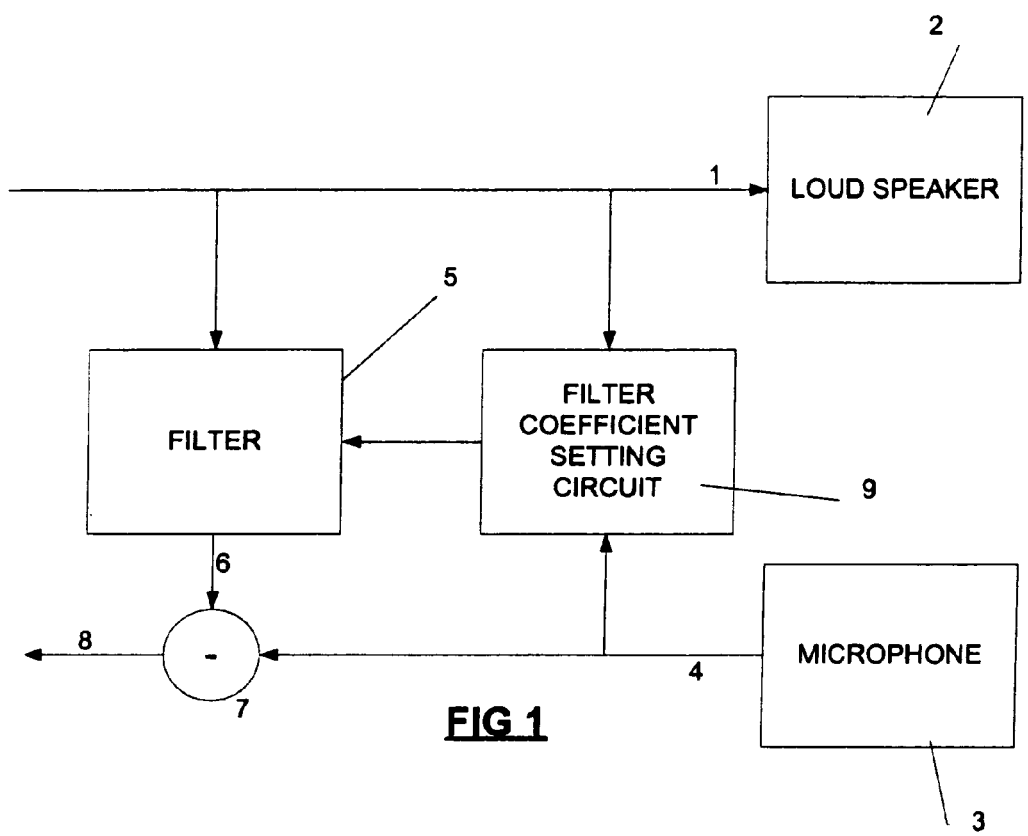
FIG. 1 is a schematic illustration of an echo cancellation apparatus in accordance with an embodiment of the present invention.

Referring to FIG. 1, there is illustrated an echo cancellation apparatus. A signal 1 travels along an input line and is output through a digital to analog converter (not shown), to a loudspeaker 2. A further signal such a human voice (not shown) is passed to an input of a microphone 3. The microphone signal is converted to a digital signal by means of an analog to digital converter (not shown). It is desirable that an output signal 4 of the microphone 3 contains only the human voice signal, and none of the signal output by the loudspeaker 2. However, in practice, some of the signal output by the loudspeaker 2 will be received by the microphone 3 such that the output signal 4 comprises a combination of the human voice signal and part of the loudspeaker output signal (referred to as "the echo signal"). It is desirable to remove the echo signal present in the output signal 4 of the microphone 3.

As shown in FIG. 1, the echo cancellation apparatus comprises a filter 5, which takes as input the signal 1 and which is configured to provide an estimate 6 of the echo signal. This estimate 6 is subtracted from the microphone output signal 4 by a subtractor 7. Therefore, if the echo is accurately estimated, an output 8 of the subtractor will be equal to the human voice signal input to the microphone 3.

In order to accurately model the echo signal, the filter 5 must be provided with a set of filter coefficients which can be applied to the signal 1. The set of filter coefficients should model the acoustic response of the environment in which the loudspeaker 2 and microphone 3 are situated. The echo cancellation apparatus comprises a filter coefficient setting circuit 9, which produces suitable filter coefficients. The filter coefficient setting circuit 9 takes as inputs the signal 1 which is input to the loudspeaker and the signal 4 which is output from the microphone 3.

The echo cancellation apparatus of FIG. 1 processes discrete samples in turn. The apparatus operates at a predetermined sampling frequency ($F_s$), which determines how often samples are taken. At each sample time, values of the signal 1 input to the loudspeaker 2 ($s_f$), the signal 4 output from the microphone 3 ($s_m$), the output 6 of the filter 5 (y), and the output 8 of the subtractor 7 ($\Delta$) are considered in the manner set out below.

The purpose of the apparatus of FIG. 1 is to remove the echo signal from the signal 4 output from the microphone 3. There will be a time delay between a signal output by the loudspeaker 2 being input to the microphone 3 to form the echo signal. Furthermore, a signal output from the loudspeaker 2 at a single instant will not be input to the microphone 3 at a single instant, instead the signal output by the loudspeaker 2 will be input to the microphone 3 at a range of different times. The delay between a signal being output by the loudspeaker 2 and substantially all of that signal which are to form the echo signal being received by the microphone 3 is estimated to correspond to the time taken to obtain N samples. N will typically equate to a relatively large number of samples.

Operation of the filter 5 of FIG. 1 is described by equation (1):

$$y(t) = \sum_{\tau=0}^{N-1} s_f(t-\tau)h_t(\tau) \quad (1)$$

where
  y(t) is output 6 of the filter 5 at sample time t;
  $h_t$ is a set of N filter coefficients determined by the filter coefficient setting circuit 9 in the manner described below; and
  $s_f(t-\tau)$ is the signal 1 input to the loudspeaker 2 at sample time $(t-\tau)$;

The filtering described by equation (1) can conveniently be carried out by a Finite Impulse Response (FIR) filter, the implementation of which will be readily understood by one of ordinary skill in the art.

The signal 8 output by the subtractor 7 is described by equation (2):

$$\Delta(t) = s_m(t) - y(t) \quad (2)$$

where
  $s_m(t)$ is the signal 4 output from the microphone 3 at sample time t;
  y(t) is the signal 6 output from the filter 5 at sample time t; and
  $\Delta(t)$ is the signal 8 output from the subtractor 7 at sample time t.

If the filter 5 accurately models the echo signal included in the signal 4 output by the microphone 3, $\Delta(t)$ should be close to the human voice signal input to the microphone 3 at time t.

A value M represents the number of samples to be processed in a particular step, and coefficients of the filter 5 are updated after every M samples as described below. A counter variable is incremented with each sample to determine when M samples have been processed. Calculation of coefficients for the filter 5 using the filter coefficient setting circuit 9 is now described with reference to FIG. 2.

At step S1 the Fourier transform of the signal 4 output from the microphone 3 is calculated. This converts the time-domain signal 4 output by the microphone 3 into a frequency-domain signal. Formally, the Fourier transform can be specified as:

$$X(f) = \int_{-\infty}^{\infty} x(t)e^{-j2\pi ft} dt \quad (3)$$

Where, x(t) is the input signal and X(f) is its Fourier transform.

The above definition is formed from traditional continuous mathematics, but as described above, the present invention uses discrete signals sampled at a predetermined sampling frequency. The discrete Fourier transform (DFT) is specified as follows:

$$X(k) = \sum_{n=0}^{N_{FFT}-1} x(n)e^{-j\frac{2\pi}{N}nk} \quad (4)$$

Here x(n) is an arbitrary discrete signal, and X(k) is the output transform. $N_{FFT}$ is the number of samples input to the DFT.

The above equation can be implemented by means of a computer program in a manner which will be apparent to one of ordinary skill in the art. However, simply writing a computer program to implement equation (4) is relatively inefficient. A more efficient way of implementing the discrete Fourier transform is the Fast Fourier Transform (FFT). The improvement in efficiency is considerable, converting an $O(N_{FFT}^2)$ operation to an $O(N_{FFT}\log_2 N_{FFT})$ operation.

Implementation of the Fast Fourier transform by means of a computer program is described in Press, William H.; Teukolsky, Saul A.; Vetterling, William T. and Flannery, Brian P. "Numerical Recipes in C—The Art of Scientific Computing" Second Edition, Cambridge University Press, 1992, at pages 497 to 536, and this description is incorporated herein by reference.

In preferred embodiments of the present invention, the FFT is used to compute the Fourier transform of the signal 4 output from the microphone 3. In preferred embodiments of the present invention, the FFT processing reads a predetermined number of samples $N_{FFT}$ of the signal 4 output from the microphone 3 ($s_m$) from a memory and applies the FFT. $N_{FFT}$ is equal to 8192 in preferred embodiments of the present invention.

The FFT calculation is carried out according to equations (5) and (6):

$$S_m(k) = FFT\{s_m(t - N_{FFT} + 1:t)\} \quad (5)$$

$$S_m(k) = \frac{1}{N_{FFT}} \sum_{i=0}^{N_{FFT}-1} s_m(i + t - N_{FFT} + 1) e^{\frac{-j2\pi ki}{N_{FFT}}} \quad (6)$$

where:
t is the current sample time;
$N_{FFT}$ is as described above; and
$j=\sqrt{-1}$ It should be noted that the output of the FFT has values for $N_{FFT}$ frequency bins. However, given that $s_m(t)$ is real, only part of the FFT output need be considered, for values of k as represented by equation (7)

$$S_m(k), \forall k: 0 \leq k \leq \left(\frac{N_{FFT}}{2} - 1\right) \quad (7)$$

This reduces the storage space required to implement the FFT algorithm.

Figure 2:
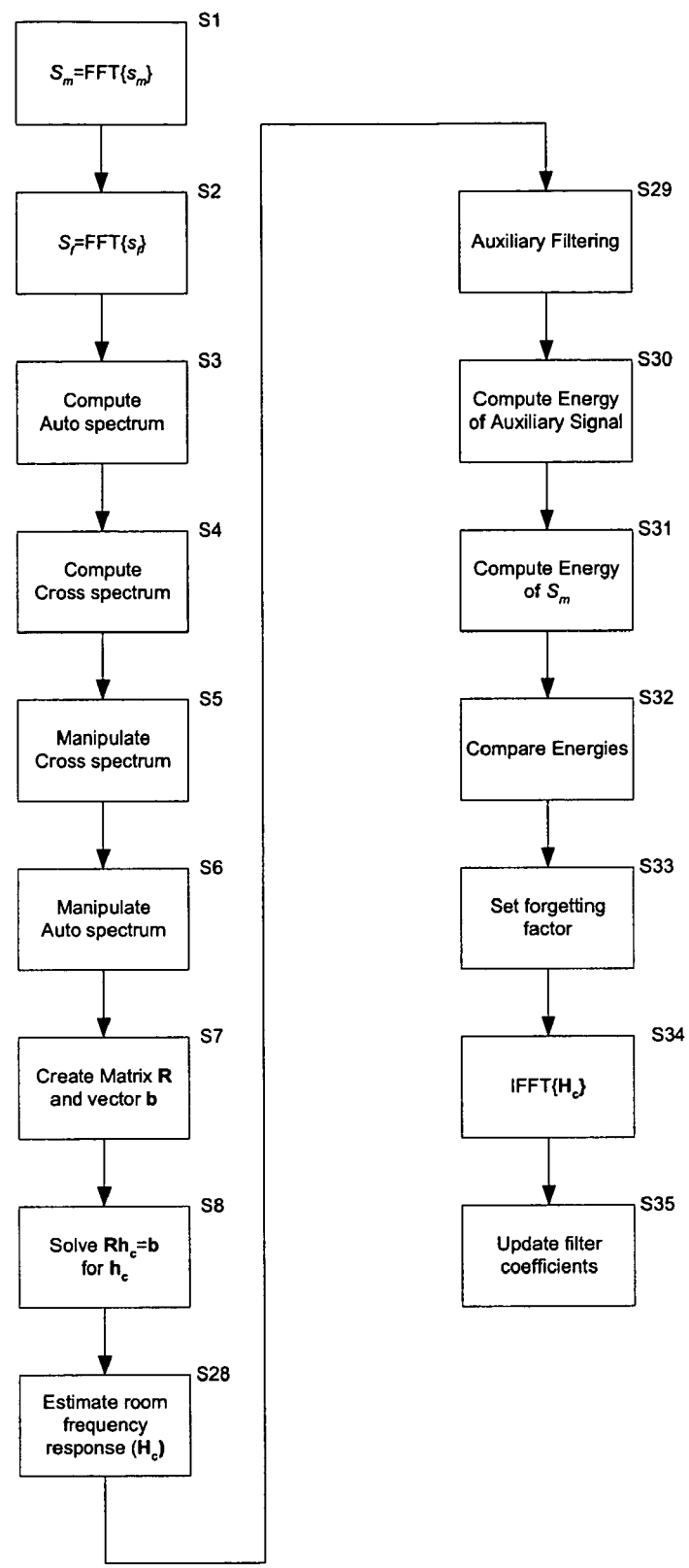
FIG. 2 is a flow chart illustrating operation of the echo canceller of FIG. 1.

At step S2 of FIG. 2, the FFT of the signal 1 input to the loudspeaker 2 ($s_f$) is calculated, by reading $N_{FFT}$ samples from an appropriate memory. The FFT of the signal $s_f$ is calculated according to equation (8):

$$S_f(k) = FFT\{s_f(t - N_{FFT} + 1:t)\} \quad (8)$$

$$S_f(k) = \frac{1}{N_{FFT}} \sum_{i=0}^{N_{FFT}-1} s_f(i + t - N_{FFT} + 1) e^{\frac{-j2\pi ki}{N_{FFT}}} \quad (9)$$

where:
t is the current sample time;
$N_{FFT}$ is as described above; and
$j=\sqrt{-1}$ Again, it should be noted that only part of the FFT output need be considered, for values of k as represented by equation (7), which again reduces the storage space required to implement the FFT algorithm.

Having computed the FFT of the signal $s_f$, the autospectrum $F_a$ of the transformed signal $S_f$ is computed at step S3. This computation is carried out in accordance with equations (10) and (11):

$$F_a(k) = S_f(k) S_f^*(k) \quad (10)$$

$$F_a(k) = (Re[S_f(k)])^2 + (Im[S_f(k)])^2 \quad (11)$$

where:
Re[ ] denotes the real part of a complex number;
Im[ ] denotes the imaginary part of a complex number; and
* represents the complex conjugate of a complex number.

At step S4 the cross spectrum of the transformed signals $S_m$ and $S_f$ is calculated according to equations (12) and (13) below:

$$F_c(k) = S_m(k) S_f^*(k) \quad (12)$$

$$F_c(k) = \{Re[S_m(k)]Re[S_f(k)] + Im[S_m(k)]Im[S_f(k)]\} + j\{Im[S_m(k)]Re[S_f(k)] - Re[S_m(k)]Im[S_f(k)]\} \quad (13)$$

It will be appreciated that the purpose of the coefficient setting circuit 9 (FIG. 1) is to generate a set of coefficients which can be applied to the signal 1 input to the loudspeaker 2. The auto and cross spectra created above can be used to generate these coefficients as is now described.

A plurality of polynomial B-spline functions are generated using computer programs described below. These functions are combined with the auto and cross spectra in the coefficient setting process. $N_b$ B-splines $B_n$ (where $n=1, \ldots N_b$) each having values defined at frequencies within the range analysed by the FFT process are provided. Vectors $K_{max}$ and $K_{min}$ each having $N_b$ elements are provided. Element n of the vector $K_{max}$ specifies a maximum frequency value at which the B-spline $B_n$ has a non-zero value. Element n of the vector $K_{min}$ similarly specifies a minimum frequency value at which the B-spline $B_n$ has a non-zero value.

The cross spectrum values are manipulated using the B-splines in accordance with equation (14) at step S5:

$$b_c(n-1) = \sum_{k=K_{min}(n)}^{K_{max}(n)} B_n(k) F_c, n = 1, \ldots, N_b \quad (14)$$

where
$B_n$, $F_c$, $N_b$, $K_{min}$, and $K_{max}$ are as described above; and
$b_c$ is a vector containing $N_b$ values indexed from 0 to $N_b-1$.

That is, each of the $N_b$ B-spline functions is considered in turn. For each B-spline $B_n$ each value between $K_{min}(n)$ and $K_{max}(n)$ is considered in turn, and multiplied by the corresponding value of the cross spectrum $F_c$. The results of these multiplications are then summed to provide a value for an element of the vector $b_c$.

The auto-spectrum values computed according to equation (11) are also manipulated using the B-spline functions as described by equation (15) at step S6:

$$R_0[m, n] = \sum_{k=K_1}^{K_2} B_m(k)B_n(k)F_a(k), \ m, n = 1, \ldots, N_b \quad (15)$$

where:

$R_0$ is an $N_b \times N_b$ matrix;

$K_1 = \max(K_{min}(n), K_{min}(m))$;

$K_2 = \min(K_{max}(n), K_{max}(m))$; and $B_n$, $B_m$, $F_a$, $N_b$, $K_{min}$, and $K_{max}$ are as described above.

That is, each m, n, combination between 1,1 and $N_b$, $N_b$ is considered to generate a value for element m, n. For each m,n, combination a summation between the maximum of the minimum non-zero values of $B_n$ and $B_m$ and the minimum of the maximum non-zero values of $B_n$ and $B_m$ is computed using a counter variable k. For each value of k appropriate values of $B_n$ and $B_m$ are multiplied together with an appropriate element of the auto-spectrum $F_a$. Each summation provides an element of the matrix $R_0$.

Depending on the degree of the B-spline functions being used, only some m, n combinations produce non-zero values. With cubic B-splines (used in preferred embodiments of the invention as described below), only elements with indices such that $|m-n| \leq 3$ will produce non zero values. Therefore, given that the matrix $R_0$ is Hermitian (i.e. $R_0[m,n]=R_0[n,m]^*$, where * denotes the complex conjugate), only $(4N_b-6)$ elements of the matrix $R_0$ need be stored in memory. For B-splines of arbitrary degree p, only elements with indices such that $|m-n| \leq p$ will produce non zero values.

The matrix $R_0$ is used to generate a matrix R, according to equation (16) at step S7:

$$R[m, n] = \begin{cases} R_0[m+1, n+1], \text{ if } m \neq n \\ vR_0[m+1, n+1] + \text{ if } m = n \end{cases} \forall m, n: 0 \leq m, n \leq N_b - 1 \quad (16)$$

Where v is a coefficient (regularisation parameter) selected to aid convergence of solution of the system of linear equations (18) set out below, and is preferably set to be 1.0025.

In alternative embodiments of the invention, the matrix R may be generated according to equation (16a):

$$R[m, n] = \begin{cases} R_0[m+1, n+1], \text{ if } m \neq n \\ R_0[m+1, n+1] + \mu, \text{ if } m = n \end{cases} \forall m, n: 0 \leq m, n \leq N_b - 1 \quad (16a)$$

Where µ is a coefficient (regularisation parameter) selected to aid convergence of solution of the system of linear equations (18) set out below, and is preferably set to be non negative (i.e. $\mu \geq 0$).

A vector b is also created at step S7:

$$b = [b_c(0), \ldots b_c(N_b-1)]^T \quad (17)$$

Having formed the matrix R and the vector b, a system of linear equations (18) is created and solved at S8:

$$Rh_c = b \quad (18)$$

where:

$h_c$ is a vector of length $N_b$ such that $h_c = [h_c(0), \ldots, h_c(N_b-1)]$, and contains unknown parameters.

Any known method can be used to solve the system of linear equations (18). However, preferred embodiments of the present invention use an equation solving method known as the dichotomous coordinate descent (DCD) algorithm. The algorithm may be applied to the system of equations (18) directly, however, in preferred embodiments of the present invention given that the matrix R is real, the system of equations (18) can be broken up into real and imaginary parts using equations (19) and (20):

$$Rh_{rc} = b_r \quad (19)$$

$$Rh_{ic} = b_i \quad (20)$$

where:

$b = b_r + j \cdot b_i$; and $j = \sqrt{-1}$.

Each of equations (19) and (20) can then be solved independently, and $h_c$ can be generated according to equation (21):

$$h_c = h_{rc} + j \cdot h_{ic} \quad (21)$$

Given the way in which the matrix $R_0$ was created the matrix R is sparse. For example, where $N_b$ is set to be 1000, there will be approximately 7×1000=7000 non-zero coefficients, when cubic B-spline functions as described below are used. This arises because each B-spline will be overlapped in the frequency domain by only seven other basis B-splines, including itself. Thus most elements of the matrix R are zero, and only elements on seven main diagonals are non-zero. If arbitrary polynomial functions are used in place of cubic B-splines, each function will overlap with each other function. Thus cubic B-splines provide sparseness defined approximately by:

$$\frac{\left(\frac{7000}{1000}\right)}{1000} = 0.007$$

(given that the matrix R in this case is of size 1000×1000).

Computational complexity of the DCD algorithm is proportional to sparseness, and thus the systems of equations (18), (19), (20) can be efficiently solved. Indeed, with sparseness of 0.007, as compared to sparseness of 1 obtained when arbitrary polynomials are used, complexity is reduced by 1/0.007=143 times. Some algorithms other than the DCD algorithm also have such complexity properties.

Application of the DCD algorithm to the system of equations (19) is now described with reference to FIG. 3. At step S9 the matrix R and the vector b are initialised as described above, and all elements of the vector $h_c$ are set to zero.

The algorithm maintains three counter variables p, m and it, a parameter $N_b$ as described above which represents the number of elements in the solution vector (and also the number of equations), a parameter $M_b$ which represents the number of bits used to represent each element of the solution vector $h_{re}$ (which may suitably be twelve), a parameter Nit which represents the maximum number of iterations through which the algorithm can pass for a particular value of m (which may suitably be eighty), a variable Flag which is used to indicate whether or not the solution vector has been updated, and a constant H which is a value greater than or equal to the magnitude of the maximum value which is expected for any value of the solution vector $h_{rc}$. That is, the algorithm considers only solutions lying between −H and +H.

Figure 3:
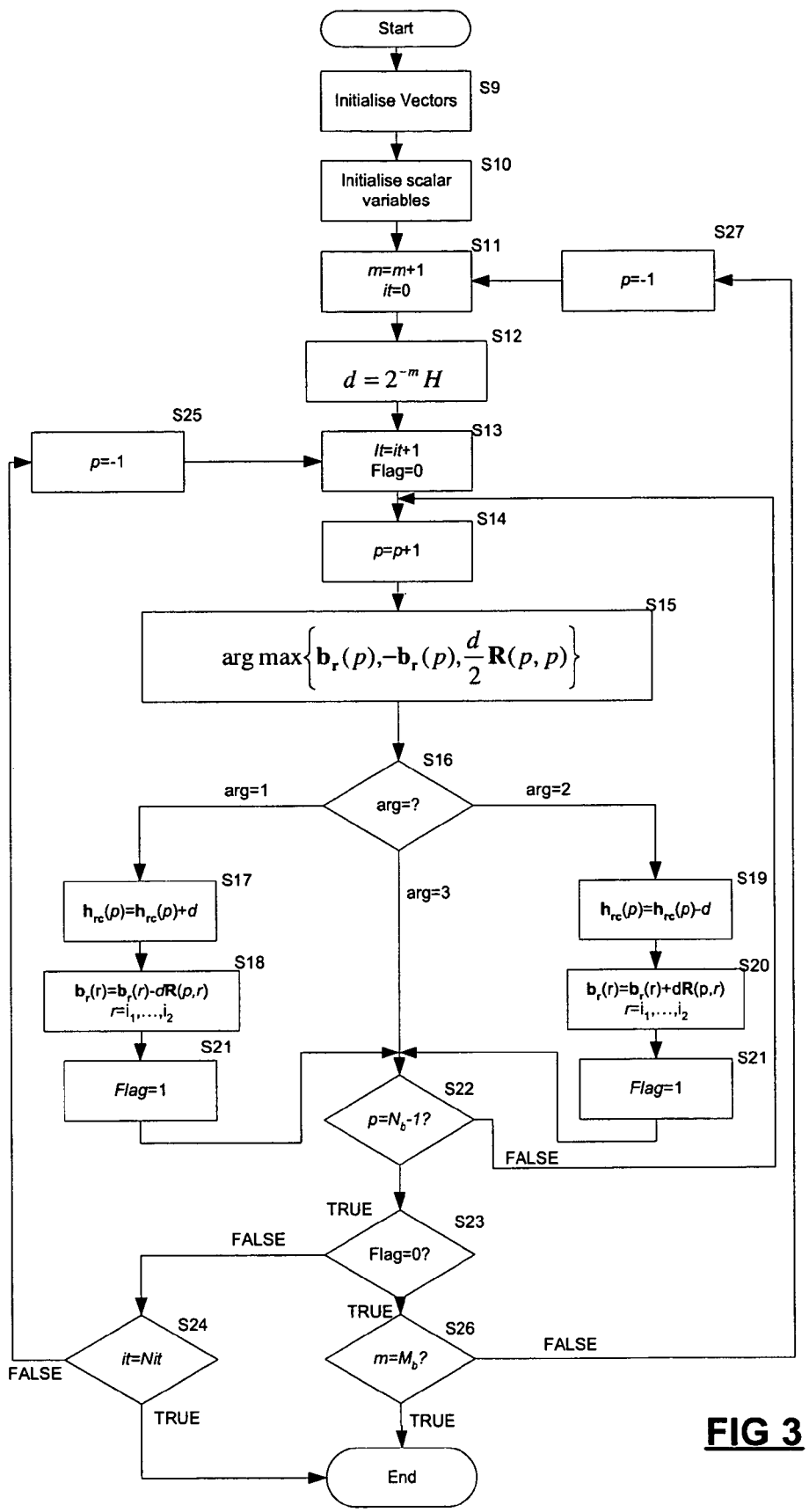
FIG. 3 is a flow chart showing part of the flow chart of FIG. 2 concerned with solving equations in further detail.

Some of these variables are initialised at step S10 and step S11 of FIG. 3. m and it are initialised to zero. p is initialised to −1. $N_b$, $M_b$, and Nit are set to the values described above which can either be chosen by a user or hard coded into the algorithm. H is initialised to 1, and a step size parameter d is initialised to H.

Operation of the algorithm can be summarised as follows. Each bit m of all elements p of the solution vector $h_{rc}$ is considered in turn. As described below, for each bit an element of the vector $b_r$ is compared with various conditions and the result of this comparison determines whether or not further processing is applicable. This further processing comprises an appropriate update of the element p of the solution vector $h_{rc}$ corresponding to the element being considered and updates of selected elements of the vector $b_r$.

When it is determined that further processing for that element is not appropriate (for the current bit), the next element is considered. When each element has been considered for that particular bit, all elements of the solution vector are considered for the next bit in turn, and updated appropriately. This process continues until all elements have been considered for all bits. If the total number of iterations for any one bit reaches a predetermined limit the algorithm again ends. The algorithm is described in further detail below.

At step S11, the value of m is incremented to '1'. Thus, the algorithm is now considering the first bit of each element in the solution vector $h_{rc}$. it is set to 0 to indicate that no iterations have yet taken place for the current value of m.

At Step S12, a step size parameter d is updated according to equation (22):

$$d = 2^{-m} H \quad (22)$$

where m and H are as described above. Given that m is set to 1, d is initially set to be equal to $$\frac{H}{2}.$$

As will be described below, setting d in accordance with equation (22) allows each bit of each value of the solution vector $h_{rc}$ to be considered in turn.

At Step S13 of FIG. 3, the variable it is incremented, and the variable Flag is set to '0'. p (the current element of the solution vector under consideration) is incremented at Step S14.

Having performed the necessary incrementation and initialisation, the algorithm can begin processing elements of the vectors, in an attempt to solve the system of equations.

At step S15, the following operation is performed:

$$\arg = \mathrm{argmax}\left\{b_r(p), -b_r(p), \frac{d}{2} R(p, p)\right\} \quad (23)$$

where $$\mathrm{argmax}\left\{b_r(p), -b_r(p), \frac{d}{2} R(p, p)\right\} = \quad (24)$$

$$\begin{cases} 1, \text{if}\left\{b_r(p) > -b_r(p) \wedge b_r(p) > \frac{d}{2} R(p, p)\right\} \\ 2, \text{if}\left\{-b_r(p) > b_r(p) \wedge -b_r(p) > \frac{d}{2} R(p, p)\right\} \\ 3, \text{if}\left\{\frac{d}{2} R(p, p) \geq -b_r(p) \wedge \frac{d}{2} R(p, p) \geq b_r(p)\right\} \end{cases}$$

The value of arg is assessed at the decision block of step S16.

If arg=1, the element of the solution vector under consideration, that is $h_{rc}(p)$, is set according to equation (25) at step S17.

$$h_{rc}(p) = h_{rc}(p) + d \quad (25)$$

The vector b is then updated such that values of b are set according to equation (26) at step S18:

$$b_r(r) = b_r(r) - dR(p, r), \forall r : i_1 \leq i_2 \quad (26)$$

where
$i_1 = \max(1, p-3)$; and
$i_2 = \min(N_b, p+3)$.

That is, at most seven values of the vector $b_r$ are updated.

If arg=2, the element of the solution vector under consideration, that is $h_{rc}(p)$, is set according to equation (27) at step S19.

$$h_{rc}(p) = h_{rc}(p) - d \quad (27)$$

The vector $b_r$ is then updated such that values of $b_r$ are set according to equation (28) at step S20:

$$b_r(r) = b_r(r) + dR(p, r), \forall r : i_1 \leq r \leq i_2 \quad (28)$$

where
$i_1 = \max(1, p-3)$; and
$i_2 = \min(N_b, p+3)$.

That is, again at most seven values of the vector $b_r$ are updated.

If arg=1 or if arg=2, Flag is set to '1' at step S21.

If arg=3, no update is made to any element of the solution vector $h_{rc}$ or the vector $b_r$, and Flag is not updated.

Having made the updates set out above, a decision block at step S22 checks the condition of equation (29);

$$p = N_b - 1 \quad (29)$$

If p is not equal to $N_b-1$ (i.e. all elements of the solution vector $h_{rc}$ have not yet been considered), control returns to step S14 and p is incremented. This process continues until all entries in the solution vector $h_{rc}$ have been considered, and $h_{rc}$ and $b_r$ are updated in the manner set out above.

If p is equal to $N_b-1$ (step S22), a check is made to determine the value of Flag (step S23).

Flag is initially set to '0' at step S13, and only updated (to be equal to '1') if entries of the solution vector $h_{rc}$ and the vector $b_r$ are amended by steps S17 and S18, or steps S19 and S20. Thus, if Flag=1, it can be deduced that a change was made to at least one element of $h_{rc}$ (i.e. one $h_{rc}(p)$ value) and some values of $b_r$, during the current iteration it. Therefore, assuming that the total number of iterations it has not exceeded the limit set by Nit (checked at S24), p is reset to '−1' at step S25, control returns to step S13, and the current bit is again processed for each element p of the solution vector $h_{rc}$. This is because further processing of each element of $h_{rc}$ for the current value of m may result in further updates. If the total number of iterations has reached the limit set by Nit (step S24), the algorithm exits.

If it is the case that Flag=0 (step S23), it can be deduced that no updates have been made to any elements of the solution vector $h_{rc}$ or the vector $b_r$ for any value of p (that is any element of the solution vector $h_{rc}$). Given that further iterations of steps S13 to S23 will result in no changes to the elements of $h_{rc}$ (given that neither d, $h_{rc}$ nor $b_r$ have changed), a check is made to determine whether or not all bits m have been considered (step S26), by comparing the current value of m with the total number of bits $M_b$. If it is the case that m=$M_b$, i.e. all bits have been considered, there is no work for the algorithm to do, and the algorithm exits.

If it is the case that all bits have not been considered, p is reset to −1 at step S27, and control returns to step S11, and the algorithm processes the next bit of the solution vector entries.

In the preceding discussion, it has been explained that entries of the solution vector $h_{rc}$ are processed for each bit of the solution vector entries, starting with the most significant bit. However, it can be seen from the preceding discussion, that at all steps the entire value of an element of $h_{rc}$ is used for update. Bitwise processing is in fact achieved because following each increment of m (step S11) a new value of d is created at step S12. Given that each increment of m will result in the value of d being divided by two (given the presence of the expression $2^{-m}$ in the expression for d), and given that d is used to update both $h_{rc}$ and $b_r$, after an update of d the next most significant bit is then updated.

It has been explained that H is preferably set to be equal to 1. That is:

$$H=2^0=1 \quad (30)$$

Thus, when H is chosen in accordance with equation (30), the value of d can be updated without multiplication or division, simply by appropriate bit shift operations. This is particularly advantageous, because microprocessors can typically carry out bit shift operations far more efficiently than multiplication or division. In some embodiments of the present invention the value of H may instead by set to a different power of two, and in such cases the algorithm can still be implemented using bit shift operations, thus achieving the mentioned efficiency benefit.

FIG. 4 illustrates a MATLAB program for implementing the algorithm of FIG. 3.

Having carried out the algorithm described above, the vector $h_{rc}$ will now be a solution vector to the system of equations (19). The system of equations (20) can similarly be solved to produce $h_{ic}$, and a solution vector $h_c$ can then be formed according to equation (21).

Referring back to the flow chart of FIG. 2, an estimate of the room frequency response is then calculated at step S28 in accordance with equation (31):

$$H_c(k) = \sum_{n=1}^{N_b} h_c(n-1)B_n(k), k = 0, \ldots, N_{FFT}-1 \quad (31)$$

That is, for each value of the Fourier transform a sum is calculated by multiplying each value n of the vector $h_c$ by a value from a selected B-spline function n, and adding the results of the multiplications. The resulting vector $H_c$ represents an estimate of the acoustic frequency response of the environment in which the microphone 3 and loudspeaker 2 (FIG. 1) are located. Elements of this vector are therefore used as coefficients for an auxiliary filter which filters the frequency domain signal $S_f$ input to the loudspeaker 2 and subtracts the filtered result from the frequency domain signal $S_m$, as represented by equation (32), at step S29:

$$Y_a(k)=S_m(k)-S_f(k)H_c(k), k=0,\ldots,N_{FFT}-1 \quad (32)$$

Energy, $D_e$, of the residual signal $Y_a$ is then calculated at step S30, by summing the squares of all value of the vector $Y_a$ according to equation (33):

$$D_e = \sum_{k=0}^{N_{FFT}-1} |Y_a(k)|^2 = \sum_{k=0}^{N_{FFT}-1} (\text{Re}[Y_a(k)]^2) + (\text{Im}[Y_a(k)]^2) \quad (33)$$

Similarly, energy, $D_m$, of the signal $S_m$ is then calculated at step S31 by summing the squares of values of $S_m$ according to equation (34):

$$D_m = \sum_{k=0}^{N_{FFT}-1} |S_m(k)|^2 = \sum_{k=0}^{N_{FFT}-1} (\text{Re}[S_m(k)]^2) + (\text{Im}[S_m(k)]^2) \quad (34)$$

The values of $D_e$ and $D_m$ are then compared with themselves, and also with elements of a three element vector $T_{sh}$ which contains predetermined threshold energy levels (step S32). In preferred embodiments of the present invention, $T_h$ is set according to equation (35):

$$T_{sh}=[0.001, 0.003, 0.125] \quad (35)$$

It will be appreciated that in alternative embodiments of the present invention, the vector $T_{sh}$ may contain a different number of predetermined threshold energy levels.

This comparison determines the value of a parameter α which is used to modify coefficients of the filter 5 (FIG. 1). The parameter α is computed according to equation (36) at step S33.

$$\alpha = \begin{cases} \alpha_0(1), & \text{if } D_e < T_{sh}(1)D_m \\ \alpha_0(2), & \text{if } T_{sh}(1)D_m \leq D_e < T_{sh}(2)D_m \\ \alpha_0(3), & \text{if } T_{sh}(2)D_m \leq D_e < T_{sh}(3)D_m \\ 0, & \text{if } D_e \geq T_{sh}(3)D_m \end{cases} \quad (36)$$

where $\alpha_0 = [1,0.25,0.05]$ where $\alpha_0$=[1, 0.25, 0.05]

Figure 5:
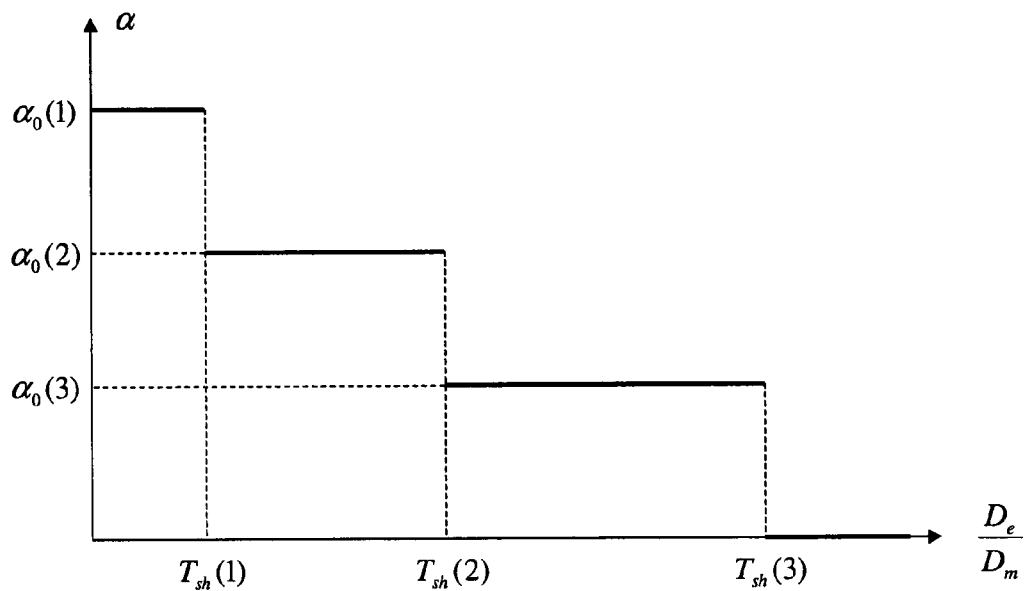
FIG. 5 is a graph showing how forgetting factors are selected in the flow chart of FIG. 2.

FIG. 5 is a graph showing the relationship between the value $$\frac{D_e}{D_m}$$

and the value taken by α.

The inverse fast Fourier transform (IFFT) of the function $H_c(k)$ is then computed at step S34, to obtain a representation of $H_c$ in the time domain as shown in equation (37):

$$g_c=\text{IFFT}\{H_c\} \quad (37)$$

where $g_c$ is an N element vector.

Having computed appropriate values of α and $g_c$, values of $h_t$ which are used as coefficients of the filter 5 (FIG. 1) are updated according to equation (38) at step S35. $h_t$ then remains constant until a further M samples have been processed.

$$h_t(\tau)=(1-\alpha)h_{t-M}(\tau)+\alpha g_c(\tau), \forall \tau=0,\ldots,N-1 \quad (38)$$

Figure 6:
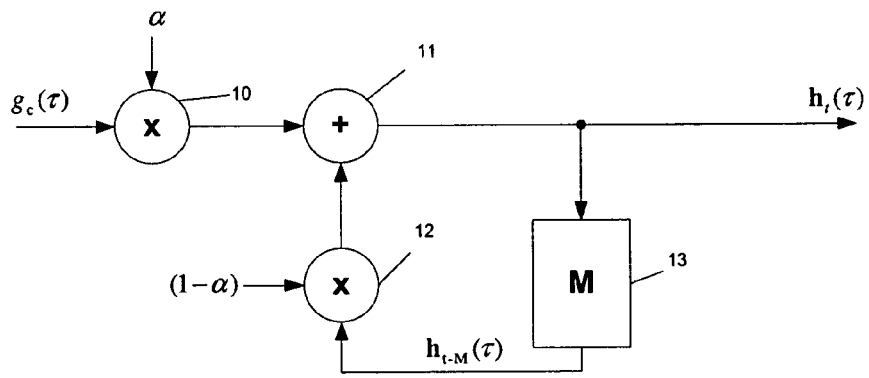
FIG. 6 is a schematic illustration of a filter which may be used in the apparatus of FIG. 1 to update coefficients of the filter shown in FIG. 1.

FIG. 6 shows a filter suitable for implementing that which is denoted by equation (38). It can be seen that a multiplier 10 multiplies a value of $g_c(\tau)$ by the determined value of $\alpha$. An adder 11 adds this value to a previous value of $h_{t-M}(\tau)$ multiplied by $(1-\alpha)$ (the multiplication being achieved by a multiplier 12). It should be noted that a time delay element 13 provides a value of $h_{t-M}(\tau)$ time delayed by M samples.

Referring back to equations (36) and (38) it can be seen that if the energy of the residual signal ($D_e$) is low relative to the energy of the signal output from the microphone ($D_m$), i.e.

$$D_e < T_{sh}(1)D_m \qquad (39)$$

$$\therefore \frac{D_e}{D_m} < T_{sh}(1) \qquad (40)$$

the value of $g_c(\tau)$ is added to the previous filter coefficient value with a maximum coefficient ($\alpha=1$). This will provide rapid convergence to accurate filter coefficient values.

It can also be seen that if the energy of the residual signal ($D_e$) is high relative to the energy of the signal output from the microphone ($D_m$), i.e.

$$D_e \geq T_{sh}(3)D_m \qquad (41)$$

$$\therefore \frac{D_e}{D_m} \geq T_{sh}(3) \qquad (42)$$

the value of $g_c(\tau)$ is not added to the previous filter coefficient value ($\alpha=0$). Therefore:

$$h_t(\tau)=h_{t-M}(\tau), \forall \tau=0, \ldots, N-1 \qquad (43)$$

Thus, the coefficients used by the filter 5 remain constant. Such energy values are likely to occur in a so-called "double-talk" situation. Keeping filter coefficients constant in this way prevents the filter from diverging.

If the relationship between the two energy levels is moderate, a moderate value of a is chosen as shown in equation (36) to speed convergence of the echo canceller.

Figure 7A:
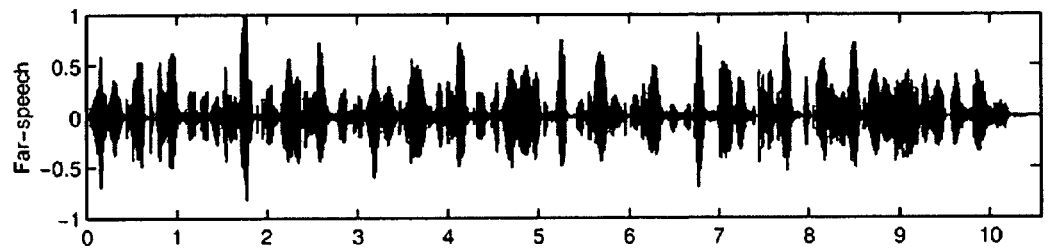
FIGS. 7A to 7C and FIGS. 8A to 8C are graphs showing operation of the echo canceller of FIG. 1.
Figure 7B:
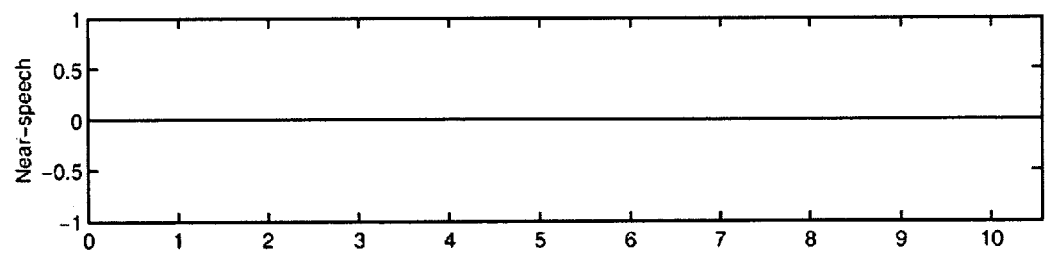
Figure 7C:
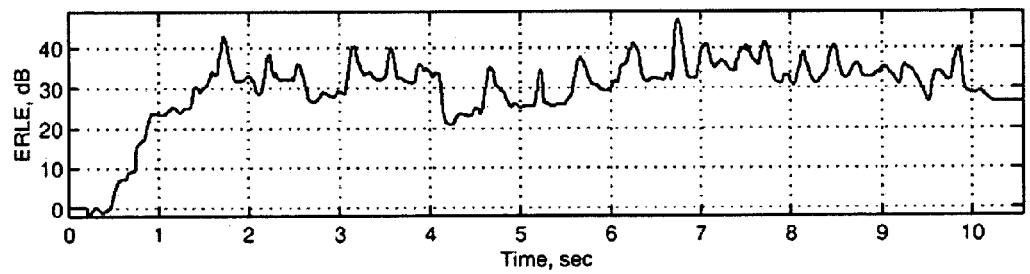

FIGS. 7A to 7C are three graphs showing signals produced when a signal is received by the loudspeaker 2, but no voice signal is received by the microphone 3. FIG. 7A shows the signal input to the loudspeaker 2, FIG. 7B shows the zero voice signal, and FIG. 7C shows attenuation (in dB) of the echo signal modelled by the filter 5 using filter coefficients created in the manner described above.

Figure 8A:
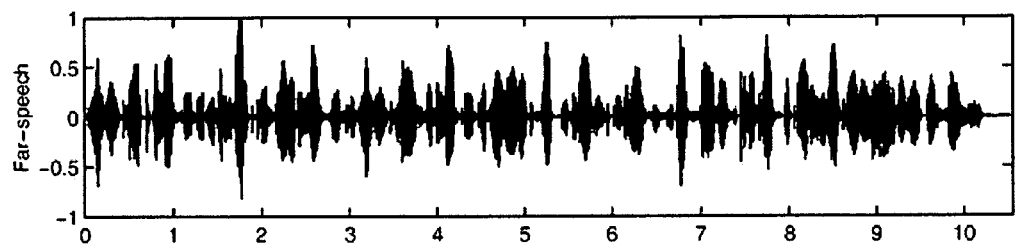
Figure 8B:
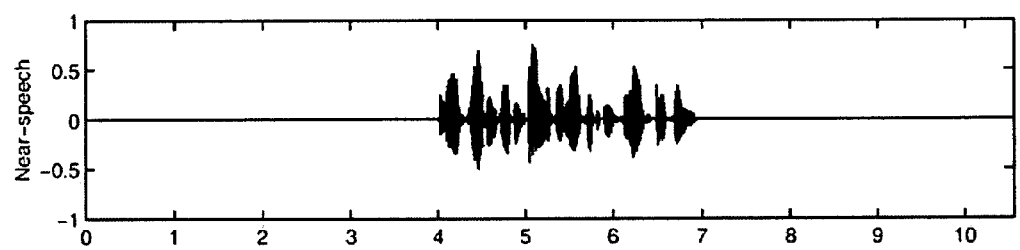
Figure 8C:
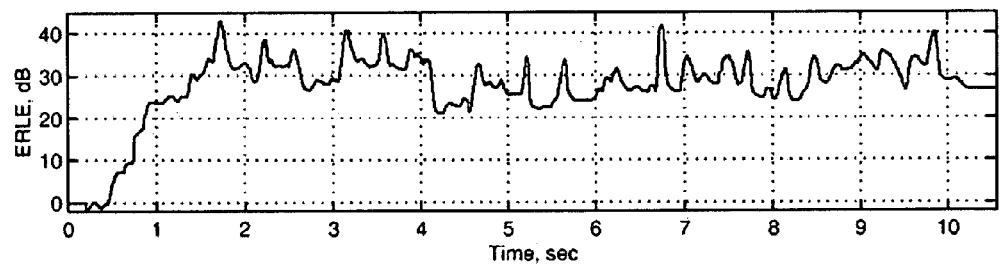

FIGS. 8A to 8C illustrate a scenario where double talk is present. FIG. 8A is identical to FIG. 7A. A voice signal input to the microphone 3 is illustrated in the graph of FIG. 8B. It can be seen from FIG. 8C that the double talk does not cause any observable difference to the modelled echo signal, as is desirable. This is contrary to that which would be expected with prior art echo cancellers where the double-talk situation would cause the echo signal to exhibit erratic behaviour, which is clearly disadvantageous.

Having described operation of the echo canceller, calculation of the $N_b$ B-splines used in the method described above is now described. B-splines are well known in the art and are described in, for example Unser, M: "Splines, a perfect fit for Signal and Image Processing", IEEE Signal Processing Magazine November 1999, pp 22-38, the contents of which are herein incorporated by reference. The use of B-splines is therefore not described in detail here, however it can be noted that B-splines can be defined by equations (44) to (47)

$$b_0(f) = \begin{cases} 1, & \text{if } -\frac{F}{2} < |f| < \frac{F}{2} \\ \frac{1}{2}, & \text{if } |f| = \frac{F}{2} \\ 0, & \text{otherwise} \end{cases} \qquad (44)$$

$$b_1(f) = \begin{cases} 1 - \frac{|f|}{F}, & \text{if } |f| < F \\ 0, & \text{otherwise} \end{cases} \qquad (45)$$

$$b_2(f) = \begin{cases} \frac{3}{4} - \frac{f^2}{F^2}, & \text{if } |f| < \frac{F}{2} \\ \frac{f^2}{2F^2} - \frac{3|f|}{2F} + \frac{9}{8}, & \text{if } \frac{F}{2} \leq |f| < \frac{3F}{2} \\ 0, & \text{otherwise} \end{cases} \qquad (46)$$

$$b_3(f) = \begin{cases} \frac{1}{6}\left(2 - \frac{|f|}{F}\right)^3 - \frac{2}{3}\left(1 - \frac{|f|}{F}\right)^3, & \text{if } 0 \leq |f| < F \\ \frac{1}{6}\left(2 - \frac{|f|}{F}\right)^3, & \text{if } F \leq |f| < 2F \\ 0, & \text{otherwise} \end{cases} \qquad (47)$$

where f is a particular frequency, and F is a frequency shift between two neighbouring B-splines.

Equation (44) defines a zero order B-spline, equation (45) defines a first order B-spline, equation (46) defines a second order B-spline and equation (47) defines a third order or cubic B-spline. B-splines of other orders can also be defined. Preferred embodiments of the present invention make use of cubic B-splines in accordance with equation (47). Using cubic B-splines provides a relatively sparse matrix R as described above. It should be noted that using lower order B-splines will reduce both sparseness and computational complexity, but will do this at the cost of accuracy. For example zero-order B-splines defined by equation (44) will provide a matrix R, in which only elements on the main diagonal are non-zero. However zero-order B-splines do not provide sufficiently accurate modelling. Thus, it has been found that cubic B-splines provide a suitable compromise between computational complexity and accuracy.

FIG. 9 shows MATLAB code which can be used to generate cubic B-spline values. The code comprises a function B_spline_basis which takes values $F_s$, $F_L$ $F_H$, $D_L$, $D_H$, and $N_{FFT}$ as input parameters. $F_s$ is the sampling frequency in Hertz as described above, $F_L$ is the lowest frequency in the output of the FFT calculations described above in Hertz, $F_H$ is the highest frequency in the output of the FFT calculations described above in Hertz. $D_L$ is the frequency step at low frequencies and $D_H$ is the frequency step at high frequencies. The function returns an array B containing appropriate values for $N_b$ cubic B-splines, together with the vector $K_{max}$ and $K_{min}$ referred to above. For any particular frequency only four B-splines will have non-zero values. Thus the array B can be of size $$\frac{N_{FFT}}{2} \times 4,$$

containing four B-spline values for each frequency.

It should be noted that line 36 of the code of FIG. 9 makes a call to a B_spl3 function which generates appropriate B-spline values. This function is shown in FIG. 10.

Figure 11:
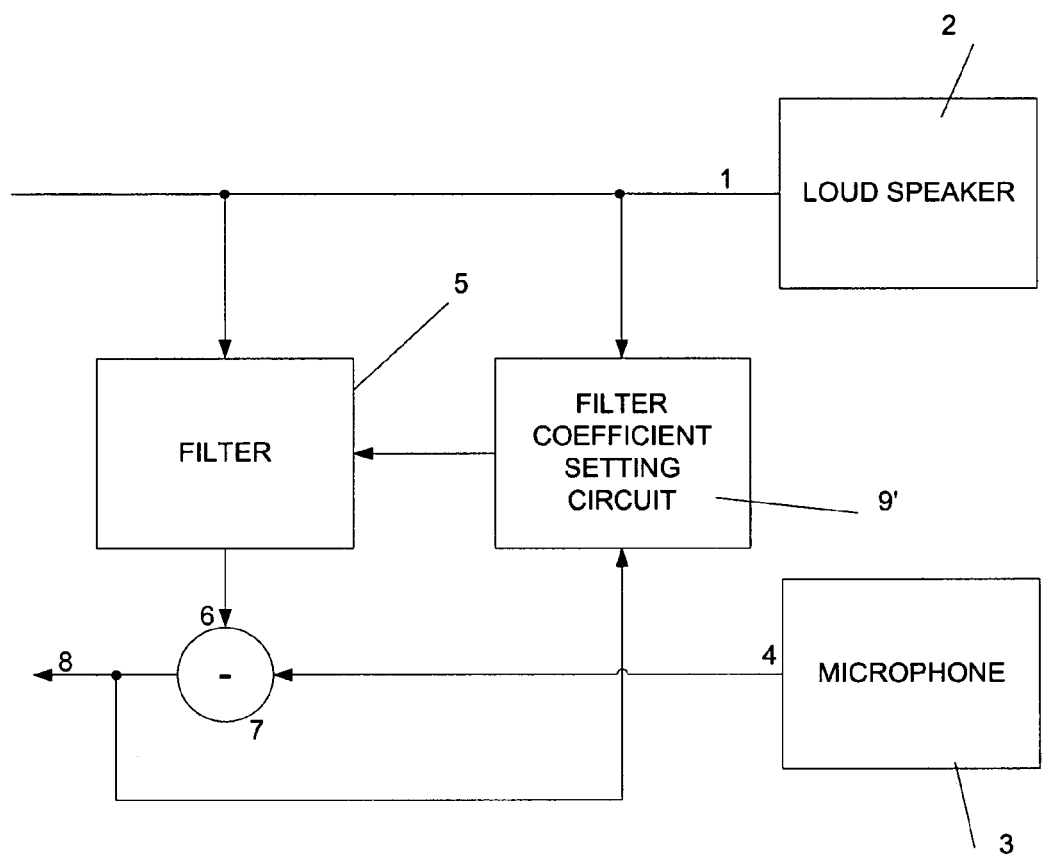
FIG. 11 is a schematic illustration of an alternative echo cancellation apparatus in accordance with an embodiment of the present invention.

FIG. 11 illustrates an alternative echo canceller architecture to that shown in FIG. 1. In FIG. 11, the filter coefficient setting circuit 9' operates identically to that of FIG. 1, but takes as input the residual signal 8 output from the subtractor 7 in place of the signal 4 output by the microphone 3. The filter coefficient setting circuit 9' thus manipulates the residual signal 8 in the same way in which the filter coefficient setting circuit 9 (FIG. 1) manipulates the signal 4 output by the microphone 3.

Embodiments of the invention such as that shown in FIG. 11 operate as described, save for an amendment to equation (38) setout above which is amended to become:

$$h_t(\tau)=h_{t-M}(\tau)+\alpha g_c(\tau), \forall \tau=0,\ldots,N-1 \tag{48}$$

Figure 12:
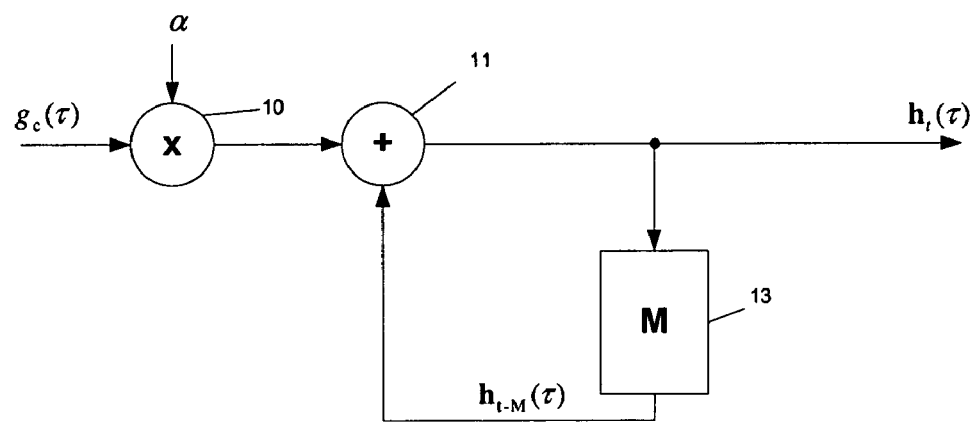
FIG. 12 is a schematic illustration of a filter which may be used in the apparatus of FIG. 11 to update coefficients of the filter shown in FIG. 11.

Equation (48) can be implemented by the filter of FIG. 12, which it can be seen is based upon that of FIG. 6.

Although preferred embodiments of the present invention have been described with reference to B-splines, it should be noted that other polynomial functions can be used in a similar manner. However, it has been found that using B-splines and more particularly cubic B-splines provides advantages in terms of computational complexity and accuracy.

Embodiments of the invention described above operate on frequency domain signals generated by Fourier transforming time domain signals. It will be appreciated that other spectral-domain transforms such as the Hadamard transform can be applied to the time-domain signals, and the output signals can then be manipulated in the manner described above. Furthermore, in some embodiments of the invention, time domain signals can be manipulated directly.

Although preferred embodiments and various alternative embodiments of the invention have been described above, it will be appreciated that various modifications can be made to the invention without departing from the scope and spirit of the invention. For example, although one way of computing B-splines is shown in FIGS. 9 and 10, it will be appreciated that B-splines can be computed in a variety of different ways which will be apparent to one of ordinary skill in the art.

The invention claimed is:

1. A method of producing an estimate of the acoustic response of an environment, the method comprising:
   receiving a first signal, and a second signal, the second signal including an acoustic echo of the first signal;
   combining said first signal and said second signal to produce a third signal;
   combining said first signal with itself to produce a fourth signal;
   multiplying a first plurality of values sampled from said third signal by respective values generated using a first predetermined polynomial function and summing results of said multiplications to generate a first weighted mean of said third signal;
   multiplying a second plurality of values sampled from said third signal by respective values generated using a second predetermined polynomial and summing results of said multiplications to generate a second weighted mean of said third signal;
   computing a plurality of weighted means of said fourth signal; and
   generating said estimate from said first and second weighted means of said third signal and said plurality of weighted means of said fourth signal;
   wherein each of said first and second polynomial functions produces values for a predetermined set of discrete frequencies; and
   the method further comprises computing for each of said first and second polynomials a maximum frequency for which the output of the polynomial is non-zero and a minimum frequency for which the output of the polynomial is non-zero.

2. A method according to claim 1, wherein said first and second signals are frequency domain signals and the method comprises multiplying each value of said third signal between said minimum frequency and said maximum frequency with corresponding values generated using a respective one of said polynomial functions.

3. A method according to claim 1, further comprising:
   multiplying a plurality of values of said fourth signal by respective values generated using a predetermined polynomial and summing results of said multiplications to generate one of said weighted means of said fourth signal.

4. A method according to claim 3, further comprising:
   multiplying a first plurality of values of said fourth signal by respective values generated using a third predetermined polynomial and summing results of said multiplications to generate a first weighted mean of said fourth signal; and
   multiplying a second plurality of values of said fourth signal by respective values generated using a fourth predetermined polynomial and summing results of said multiplications to generate a second weighted mean of said fourth signal.

5. A method according to claim 4, wherein each polynomial produces values for a predetermined set of discrete frequencies.

6. A method according to claim 1, wherein said first and second signals are frequency domain signals, the method comprising:
   spectrally transforming a first time domain signal to generate said first signal; and
   spectrally transforming a second time domain signal to generate said second signal.

7. A method according to claim 1, wherein said third signal is the cross-spectrum of the first and second signals and wherein the fourth signal is the autospectrum of the first signal.

8. A method according to claim 1 wherein:
   said first signal is output via a loudspeaker;
   said second signal is input to a microphone; and
   the loudspeaker and the microphone are located within the environment.

9. A method of producing an estimate of the acoustic response of an environment, the method comprising:
   receiving a first signal and a second signal, the second signal including an acoustic echo of the first signal;
   combining said first signal and said second signal to produce a third signal;
   combining said first signal with itself to produce a fourth signal;
   multiplying values sampled from said fourth signal by respective values generated using a third predetermined polynomial and summing results of said multiplications to generate a first weighted mean of said fourth signal;
   multiplying values sampled from said fourth signal by respective values generated using a fourth predetermined polynomial and summing results of said multiplications to generate a second weighted means of said fourth signal; and
   generating said estimate from said weighted means of said third signal and said first and second weighted means of said fourth signal;

wherein each of said third and fourth polynomials produces values for a predetermined set of discrete frequencies; and the method further comprising computing for each of said third and fourth polynomials a maximum frequency for which the output of the polynomial is non-zero and a minimum frequency for which the output of the polynomial is non-zero.

10. A method according to claim 9, comprising:
spectrally transforming a first time domain signal to generate said first signal; and
spectrally transforming a second time domain signal to generate said second signal.

11. A method according to claim 9, wherein said first and second signals are frequency domain signals.

12. A method according to claim 11, further comprising:
Fourier transforming a first time domain signal to generate said first signal; and
Fourier transforming a second time domain signal to generate said second signal.

13. A method according claim 12, comprising fast Fourier transforming said first and second time domain signals.

14. A method according to claim 11, wherein said third signal is the cross-spectrum of the first and second signals.

15. A method according to claim 11, wherein the fourth signal is the auto-spectrum of the first signal.

16. A method according to claim 9, further comprising:
multiplying a plurality of values sampled from said third signal by respective values generated using a predetermined polynomial function and summing results of said multiplications to generate one of said weighted means of said third signal.

17. A method according to claim 16, further comprising:
multiplying a first plurality of values of said third signal by respective values generated using a first predetermined polynomial function and summing results of said multiplications to generate a first weighted mean of said third signal; and
multiplying a second a second plurality of values of said third signal by respective values generated using a second predetermined polynomial function and summing results of said multiplications to generate a second weighted mean of said third signal.

18. A method according to claim 17, wherein each polynomial produces values for a predetermined set of discrete frequencies.

19. A method according to claim 17, wherein said third polynomial is said first polynomial, and said fourth polynomial is said second polynomial.

20. A method according to claim 9, wherein said first and second signals are frequency domain signals and the method comprises multiplying each value sampled from said fourth signal between said minimum frequency and said maximum frequency with corresponding values generated using a respective one of said polynomial functions.

21. A method according to claim 16, wherein each polynomial function is a B-spline.

22. A method according to claim 21, wherein each polynomial is a cubic function B-spline.

23. A method according to claim 9, wherein generating said estimate comprises:
generating a system of linear equations using said weighted means of said third and fourth signals; and
solving said linear equations.

24. A method according to claim 23, further comprising:
generating a system of linear equations of the form:

$$Rh_c = b$$

where:
R is a matrix generated using said weighted means of said fourth signal;
b is a vector generated using said weighted means of said third signal; and
$h_c$ is a vector representing said estimate.

25. A method according to claim 24, comprising:
generating a first system of equations of the form $Rh_{rc}=b_r$ and generating a second system of equations of the form $Rh_{ic}=b_i$, where $b=jb_i+b_r$;
solving said first and second systems of equations for $h_{rc}$ and $h_{ic}$ respectively; and
computing $h_c$ in accordance with $h_c=h_{rc}+jh_{ic}$, where $j=\sqrt{-1}$.

26. A method of producing an estimate of the acoustic response of an environment, the method comprising:
receiving a first signal, and a second signal, the second signal including an acoustic echo of the first signal,
combining said first signal and said second signal to produce a third signal;
combining said first signal with itself to produce a fourth signal;
computing a plurality of weighted means of said third signal;
computing a plurality of weighted means of said fourth signal;
generating a system of linear equations using said weighted measures of said third and fourth signals; and
generating a system of linear equations using said weighted means of said third and fourth signals; and
solving the system of linear equations using the dichotomous coordinate descent algorithm to generated said estimate from said system of linear equations.

27. A method according to claim 26, further comprising:
multiplying values of said vector $h_c$ with values generated by a predetermined polynomial function to generate a vector $H_c$.

28. A method according to claim 27, comprising filtering said first signal using said vector $H_c$ as filter coefficients.

29. A method according to claim 28, further comprising subtracting the result of said filtering from said second signal to generate a residual signal.

30. A method according to claim 29, further comprising calculating a value indicative of energy of said residual signal ($D_c$).

31. A method according to claim 30, further comprising calculating a value indicative of energy of said second signal ($D_m$).

32. A method according to claim 31, further comprising:
storing an estimate of impulse response of a filter operable to remove an estimate of the echo of first signal included in the second signal;
updating said estimate based upon said energy values.

33. A method according to claim 32, further comprising:
comparing said energy values with at least one predetermined threshold; and
updating said estimate based upon said comparison.

34. A method according to claim 33, wherein said updating multiplies values of said estimate by a factor based upon a scalar parameter ($\alpha$).

35. A method according to claim 34, wherein said scalar parameter ($\alpha$) is determined according to:

$$\alpha = \begin{cases} \alpha_0(1), & \text{if } D_e < T_{sh}(1)D_m \\ \alpha_0(2), & \text{if } T_{sh}(1)D_m \leq D_e < T_{sh}(2)D_m \\ \alpha_0(3), & \text{if } T_{sh}(2)D_m \leq D_e < T_{sh}(3)D_m \\ 0, & \text{if } D_e \geq T_{sh}(3)D_m \end{cases}$$

where $\alpha_0$ is a three element array containing predetermined scalar values and $T_{sh}$ is a three element array storing predetermined threshold values.

36. A method according to claim 32, further comprising computing the inverse Fourier transform of said vector $H_c$.

37. A method according to claim 36, wherein said updating comprises adding to said estimate of impulse response a value output by said inverse Fourier transform multiplied by a determined scalar value.

38. A method according to claim 9 wherein:
said first signal is output via a loudspeaker;
said second signal is input to a microphone; and
the loudspeaker and the microphone are located within the environment.

39. A method according to claim 9, wherein:
said first signal is output from a loudspeaker;
said second signal is a signal input to a microphone from which an estimate of said acoustic echo has been subtracted; and
said loudspeaker and said microphone are located within the environment.

40. A method according to claim 9 wherein said estimate comprises filter coefficients.

41. A method according to claim 40 wherein said signal is filtered using said filter coefficients to generate an estimate of the acoustic echo of said first signal included in said second signal.

42. A method according to claim 41 wherein said filtering is finite impulse response filtering.

43. A method according to claim 40 comprising:
generating a system of linear equations of the form:

$$Rh_c = b$$

where:
R is a matrix generated using said weighted means of said fourth signal;
b is a vector generated using said weighted means of said third signal; and
$h_c$ is a vector representing said estimate; and
generating said coefficients using said vector $h_c$.

44. A method wherein a data carrier carrying computer program code, which when executed, causes a computer to produce an estimate of the acoustic response of an environment according to the method of claim 9.

45. A computer apparatus for producing an estimate of the acoustic response of the environment in which a system is located, comprising:
a program memory containing processor readable instructions; and
a processor for reading and executing instructions contained in the program memory;
wherein said processor readable instructions include instructions which when executed, to control the processor to carry out the method of claim 9.

46. A method of producing an estimate of the acoustic response of an environment, the method comprising:
receiving a first signal, and a second signal, the second signal including an acoustic echo of the first signal;
combining said first signal and said second signal to produce a third signal;
combining said first signal with itself to produce a fourth signal;
multiplying each of a plurality of points of said third signal by a respective associated value of a first B-spline function to generate a plurality of first multiplications, and summing said first multiplications to generate a first summation
multiplying each of a plurality of points of said fourth signal by a respective associated value of a second B-spline function and a respective associated value of a third B-spline function to generate a plurality of second multiplications, and summing said second multiplications to generate a second summation; and
generating said estimate from said first and second summations.

47. A method according to claim 46 wherein said first B-spline function and said second B-spline function are the same.

48. A method according to claim 46 further comprising:
generating a plurality of first summations, each of said first summations being generated by multiplying each of a plurality of points of said third signal by a respective associated value of a first respective B-spline function to generate a respective plurality of first multiplications and summing said first multiplications to generate said first summation;
generating a plurality of second summations, each of said second summations being generated by multiplying each of a plurality of points of said fourth signal by a respective associated value of a second respective B-spline function and a respective associated value of a third respective B-spline function to generate a plurality of second multiplications, and summing said second multiplications to generate each of said plurality of second summations; and
wherein said estimate is generated from said plurality of first summations and said plurality of second summations.

49. A method according to claim 27, wherein said predetermined polynomial function is a B-spline.

* * * * *